US011826932B2

(12) United States Patent
Bright

(10) Patent No.: US 11,826,932 B2
(45) Date of Patent: Nov. 28, 2023

(54) POLYMER FOAM SYSTEM AND METHOD

(71) Applicant: HiTek Fabrication, St. Peters, MO (US)

(72) Inventor: Shawn Bright, Columbia, MO (US)

(73) Assignee: HITEK FABRICATION, St. Peters, MO (US)

( * ) Notice: Subject to any disclaimer, the term of this patent is extended or adjusted under 35 U.S.C. 154(b) by 47 days.

(21) Appl. No.: 17/319,419

(22) Filed: May 13, 2021

(65) Prior Publication Data

US 2021/0402656 A1 Dec. 30, 2021

Related U.S. Application Data

(60) Provisional application No. 63/046,093, filed on Jun. 30, 2020.

(51) Int. Cl.
*B29C 44/36* (2006.01)
*B29C 44/02* (2006.01)
*B29C 44/34* (2006.01)
*B29C 44/60* (2006.01)
*B29K 105/00* (2006.01)

(52) U.S. Cl.
CPC ............ *B29C 44/367* (2013.01); *B29C 44/02* (2013.01); *B29C 44/3415* (2013.01); *B29C 44/60* (2013.01); *B29K 2105/0002* (2013.01)

(58) Field of Classification Search
CPC .... B05B 7/1693; B29C 44/365; B29C 44/367
See application file for complete search history.

(56) References Cited

U.S. PATENT DOCUMENTS

| 2003/0127765 A1 | 7/2003 | Weiland et al. |
| 2003/0195651 A1* | 10/2003 | Cherfane ............... B29B 7/7433 53/139.5 |
| 2003/0197296 A1* | 10/2003 | Krassilnikov ........... B29C 41/04 425/348 R |

(Continued)

FOREIGN PATENT DOCUMENTS

| KR | 20-0345895 | 3/2004 |
| WO | WO2002098785 | * 12/2002 |

OTHER PUBLICATIONS

Door Definition (Year: 2023).*

(Continued)

*Primary Examiner* — Alison L Hindenlang
*Assistant Examiner* — Alexander A Wang
(74) *Attorney, Agent, or Firm* — The Small Patent Law Group LLC; Christopher R. Carroll

(57) ABSTRACT

A system for producing foams for prosthetics and orthotics include a heated housing that stores monomer containers, temperature-controlled hoses separately coupled with the containers and configured to receive monomers from the containers, a dispensing gun assembly fluidly coupled with the containers by the hoses, and a computer controller configured to control a dispensing time period during which the monomers are dispensed from the containers and through the hoses to the dispensing gun assembly and dispensed out of the dispensing gun assembly as a polymer foam. The controller is configured to stop dispensing of the polymer foam out of the dispensing gun assembly upon expiration of the dispensing time period.

19 Claims, 8 Drawing Sheets

(56) References Cited

U.S. PATENT DOCUMENTS

| | | | |
|---|---|---|---|
| 2010/0247702 A1 | 9/2010 | Ben Lulu | |
| 2014/0183789 A1 | 7/2014 | Whatcott et al. | |
| 2016/0107179 A1* | 4/2016 | McAndrew | B05B 12/1418 239/75 |
| 2016/0158986 A1 | 6/2016 | Ochiai | |
| 2016/0325512 A1* | 11/2016 | Acda | G05B 15/02 |
| 2022/0227025 A1* | 7/2022 | Akamatsu | B29C 45/1742 |

OTHER PUBLICATIONS

Era Polymers, "Foams Processing Guide" Processing Guide, Webpage, www.erapol.com.au/technical/foam/processing-guide/ (4 pages).

Foam Supplies, Inc. "Solvent-Less Urethane Gun", Operations Manual (62 pages).

International Search Report for International Patent Application No. PCT/US2021/033674, dated Sep. 9, 2021.

Written Opinion Of The International Searching Authority for International Patent Application No. PCT/US2021/033674, dated Sep. 9, 2021.

International Preliminary Report on Patentability for International Patent Application No. PCT/US2021/033674, dated Jan. 12, 2023 (6 pages).

* cited by examiner

POLYMER FOAM SYSTEM AND METHOD

CROSS-REFERENCE TO RELATED APPLICATIONS

This application claims priority to U.S. Provisional Application No. 63/046,093, which was filed on 30 Jun. 2020, and the entire disclosure of which is incorporated herein by reference.

BACKGROUND

Technical Field

The subject matter described herein relates to systems and methods for manufacturing polymer foams. The foams may be used in orthotic and/or prosthetic carvings, or may be used in one or more other applications.

Discussion of Art

Polymer or polymeric foams have a variety of uses, such as in prosthetics, orthotics, high performance insulation, safety panels in automobiles, seals and gaskets, filters (e.g., oil filters), and the like. The polymer foams can be created from monomers that are mixed together to form a rigid or semi-rigid foam. But polymer foams can be expensive and difficult to produce. The rigidity, shape, and density of the bodies formed by the polymer foams can be difficult to reliably control. For example, slight changes in temperature, relative amounts of the monomers used to form the polymer foams, and the like, can significantly change the rigidity, shape, and/or density of the foam.

BRIEF DESCRIPTION

In one embodiment, a system includes a heat-containment housing configured to store monomer containers, temperature-controlled hoses separately coupled with the containers and configured to receive monomers from the containers, a dispensing gun assembly fluidly coupled with the containers by the hoses, and a computer controller configured to control a dispensing time period during which the monomers are dispensed from the containers and through the hoses to the dispensing gun assembly and dispensed out of the dispensing gun assembly as a polymer foam. The controller is configured to stop dispensing of the polymer foam out of the dispensing gun assembly upon expiration of the dispensing time period.

In one embodiment, a method includes heating monomer containers and hoses coupled with the containers and determining a dispensing time period during which monomers are dispensed from the containers and through the hoses to a dispensing gun assembly into a mold as a polymer foam. A temperature to which the monomers is heated, and the dispensing time period are based on each other. The method also can include determining when initiation of dispensing of the polymer foam begins, determining when expiration of the dispensing time period has expired, and stopping the dispensing of the polymer foam from the dispensing gun assembly responsive to expiration of the dispensing time period.

In one embodiment, a system includes hoses separately coupled with monomer containers and configured to receive monomers from the containers, a dispensing gun assembly fluidly coupled with the containers by the hoses, and a controller configured to control a dispensing time period during which the monomers are dispensed from the containers and through the hoses to the dispensing gun assembly and dispensed out of the dispensing gun assembly into a mold as a polymer foam. The dispensing time period is based on an identification of the mold. The controller is configured to stop dispensing of the polymer foam out of the dispensing gun assembly upon expiration of the dispensing time period.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
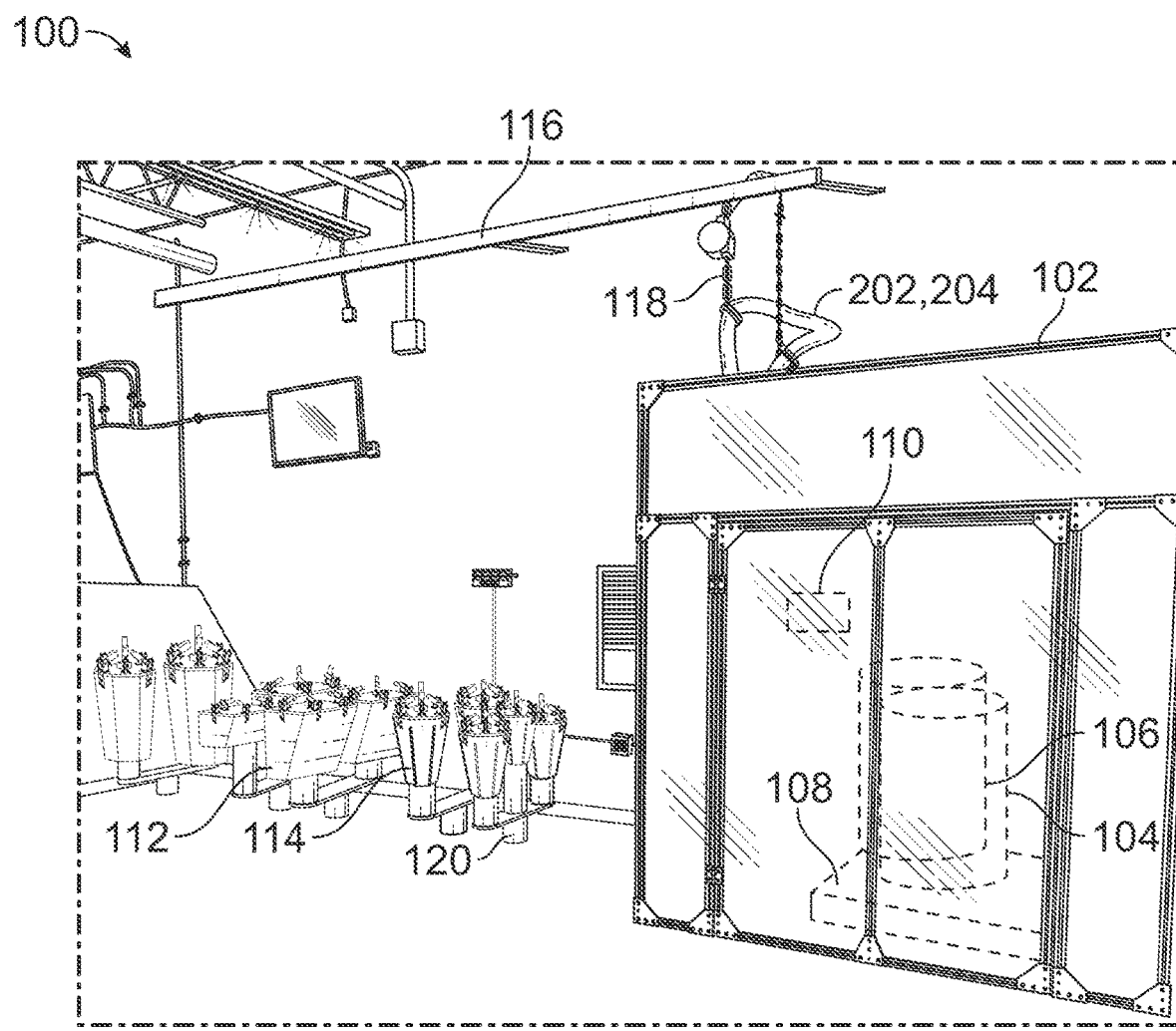
FIG. 1 illustrates one example of a polymer foam system.

FIG. 1 illustrates one example of a polymer foam system 100. The system 100 can be used to form one or more different types of polymer foams. As one example, the system 100 can be used to form rigid or semi-rigid bodies formed of polyurethane foam. Not all embodiments of the inventive subject matter, however, are limited to polyurethane foam bodies. One or more other polymer foams may be created, such as ethylene-vinyl acetate foam, low-density polyethylene foam, nitrile rubber foam, polychloroprene foam, polyimide foam, polypropylene foam, polystyrene foam, STYROFOAM, polyethylene foam, polyvinyl chloride foam, silicone foam, microcellular foam, and the like. Additionally, one example of the bodies that may be formed from the polymer foams described herein may be cut, shaved, or otherwise shaped to later carve the inside shapes of prosthetics and orthotics. Not all embodiments of the inventive subject matter are limited to forming prosthetics with the polymer foam, however. One or more other objects or devices may be created, such as insulation, automobile safety panels, seals, gaskets, filters, bedding, and the like.

The system 100 can be used to rapidly create differently shaped bodies of polymer foam at the same time with the exact amount of foam and monomers needed to form the bodies at a desired density of the foam. For example, as described herein, the system 100 can be used to control the temperature at which the monomers used to form the polymer foam is held to within a small temperature range (e.g., a range that does not deviate by more than 1% in one embodiment, by more than 3% in another embodiment, or by more than 5% in another embodiment). The system 100 also can be used to rapidly dispense the polymer foam while the foam is in a flowing state such that the amount of foam that is dispensed is within 1% of the amount of foam that is needed to form the desired body with a desired density (or within 3% of this amount, or within 5% of this amount). The system 100 also can be used to accurately dispense the polymer foam while the foam is in a flowing state such that the density of the body that is formed by the polymer foam is within 1% of a desired density (or within 3% of the desired density, or within 5% of the desired density). The tight control of temperature, foam dispensing rate and amount, and the like, can result in the system 100 creating several of the same or different sized polymer foam bodies with desired foam densities.

Figure 2:
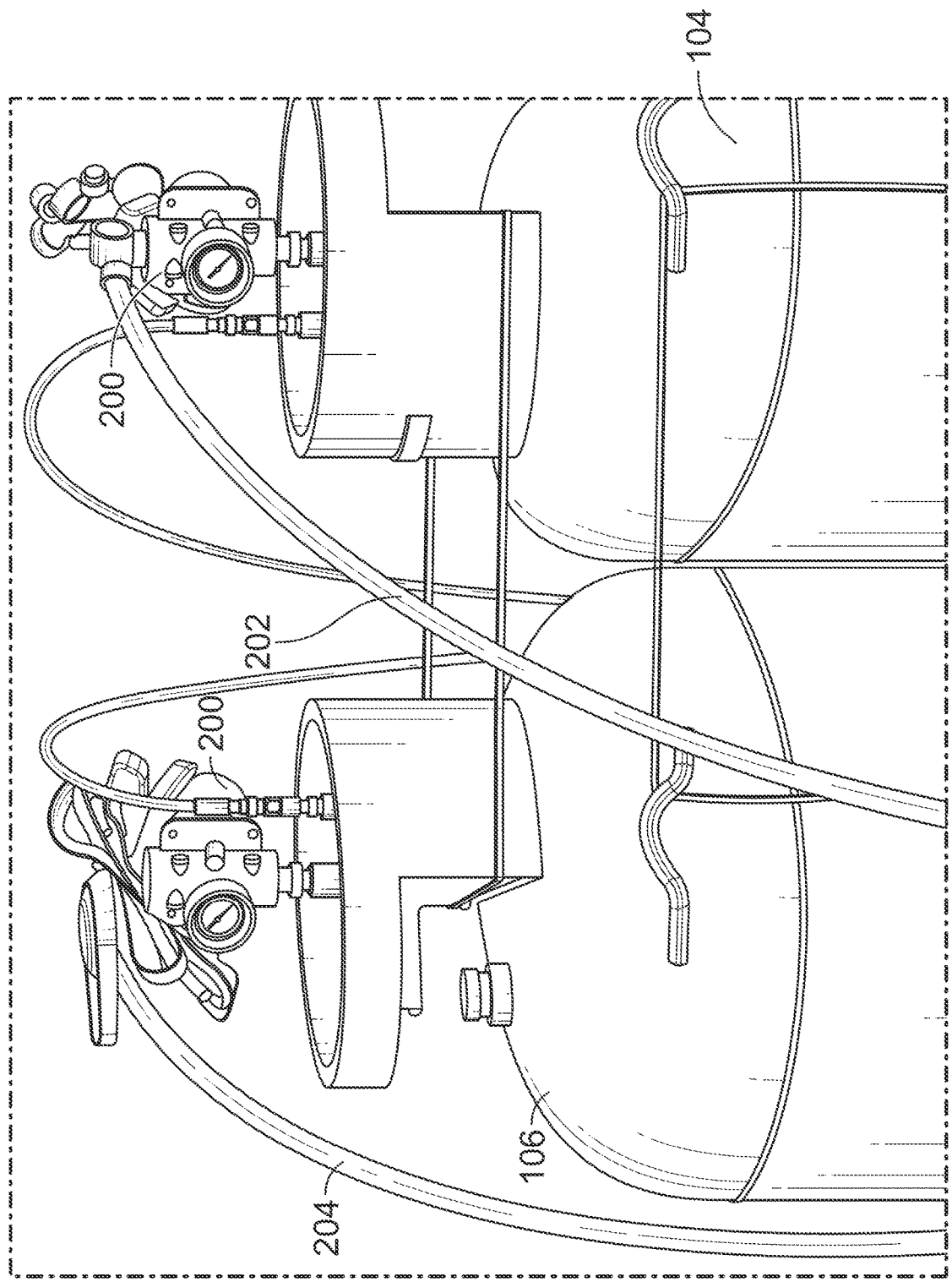
FIG. 2 illustrates monomer containers disposed in a heat-containment housing of the polymer foam system shown in FIG. 1.

The system 100 includes a heat-containment housing 102 in which several containers 104, 106 of monomers are held. FIG. 2 also shows the containers 104, 106 that are disposed in the housing 102. While only two containers 104, 106 are shown, optionally, more than two containers 104, 106 may be provided. The containers 104, 106 can be separate pressurized containers (e.g., tanks) of different monomers (e.g., in liquid and/or gaseous form) that are mixed by the system 100 to form the polymer foam. Optionally, one or more of the containers 104, 106 may not be pressurized and pumps can be used to draw and/or force the monomers out of the containers 104, 106 at designated pressures. In another embodiment, the monomer may not be held within or supplied from pressurized containers, but may be drawn or pumped from non-pressurized containers. The containers 104, 106 may be drums, totes, or other enclosure in which the monomers are held under atmospheric pressure or another reduced pressure (e.g., a pressure that is less than atmospheric pressure).

The housing 102 encloses a volume in which the containers 104, 106 are disposed. For example, the housing 102 can be formed by four vertical walls connected by a horizontal ceiling or panel. Optionally, the housing 102 can include a horizontal floor or panel on the bottom of the housing 102.

The enclosure formed by the housing 102 retains heat within the housing 102 to maintain an elevated temperature of the monomers within the containers to within a designated range (e.g., a temperature that does not vary by more than 1%, by more than 3%, or by more than 5% in different embodiments). One or more heating elements 108 may be disposed in the housing 102. For example, one or more electric heaters may be disposed beneath the containers 104, 106 to heat the containers 104, 106 from below. The temperature can be controlled by a computer controller 110 that controls the heat generated by the electric heaters. The controller 110 represents hardware circuitry that includes and/or is connected with one or more processors, such as one or more microprocessors, one or more integrated circuits, one or more field programmable gate arrays, or the like. The computer controller 110 controls various operations of the system 100, as described herein. The computer controller 110 can include one or more inputs, such as buttons, touchscreens, keyboards, or the like, to receive input. This input can dictate a temperature of the interior of the housing 102, as one example. The computer controller 110 can then control the heaters 108 to ensure that the interior of the housing 102 is held at the desired temperature.

The temperature of the monomers and foam begin to be dispensed, as well as the time during which the mixed monomers are dispensed from a dispensing gun assembly (described below) can be direct correlation with each other and can be tuned (e.g., changed based on each other) to provide a desired foam product. A change in the temperature of the monomers and/or dispensed mixture without changing a dispensing time (also referred to as a shot time) will change the density, weight, resilience, size, and/or appearance of a resultant foam. Similarly, a change in the dispensing time without changing a temperature of the monomers and/or dispensed mixture will change the density, weight, resilience, size, and/or appearance of a resultant foam.

As shown in FIG. 2, additional heating elements 200 may be coupled to outlet ends of the containers 104, 106. These heating elements 200 may be coupled with hoses 202, 204 that receive the monomers from the containers 104, 106. The heating elements 200 can include wires, cables, or other conductive bodies that extend outside of and along the hoses 202, 204. Electric current can be conducted along these wires to heat the entire or substantially all (e.g., at least 95%) of the length of the hoses 202, 204. The computer controller 110 can control the heat generated by the heating elements 200 to maintain the elevated temperature of the hoses 202, 204 and the monomers flowing within each of the hoses 202, 204.

Each of the hoses 202, 204 carries a different monomer from a respective container 104, 106 to a dispensing gun assembly (described below). For example, each hose 202, 204 can provide a separate conduit that fluidly couples the respective container 104, 106 with the same dispensing gun assembly. The hoses 202, 204 may be disposed near or adjacent to each other and disposed within a wrap or sheath. While this wrap or sheath is visible in FIG. 2, the hoses 202, 204 maintain separate flow paths or conduits for the monomers within the wrap or sheath.

In one embodiment, the computer controller 110 can separately control the heat generated by the heating elements 200 of each hose 202, 204 so that the elevated temperature of the monomer flowing through one hose 202 is different from the elevated temperature of the monomer flowing through the other hose 204. Because the monomers flowing through the different hoses 202, 204 are different, the monomers may react differently with each other when mixed due to the different temperatures, different types of polymer foams can be created. For example, a polymer foam having a first density may be formed from a first monomer at a first temperature and a different, second monomer at a different second temperature, while the same polymer foam having a different, second density may be formed from the first monomer at the same first temperature and the second monomer being at a different, third temperature.

Figure 3:
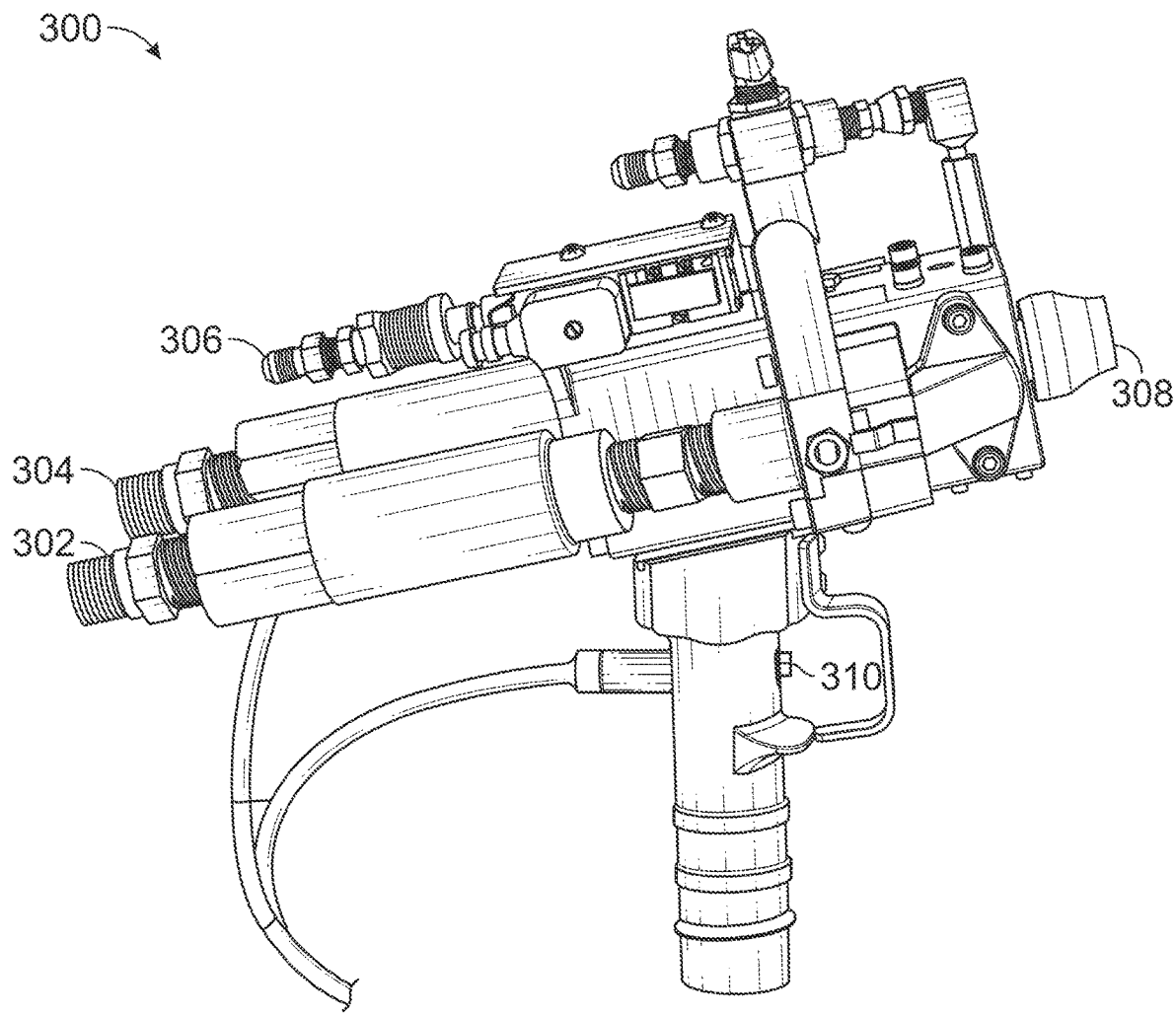
FIG. 3 illustrates one example of a dispensing gun assembly.

FIG. 3 illustrates one example of a dispensing gun assembly 300. The dispensing gun assembly 300 can be used to mix and dispense the monomers carried by the hoses 202, 204 to form the polymer foam (in a flowing or fluid state), and to direct the flowing polymer foam into one or more molds 112, 114 (shown in FIG. 1 and described below). The dispensing gun assembly 300 can be a solvent-less urethane gun provided by Foam Supplies, Inc. in one embodiment. Alternatively, another dispensing gun assembly 300 can be used. The dispensing gun assembly 300 includes inlets 302, 304 that are separately coupled with different ones of the hoses 202, 204. The hoses 202, 204 direct the monomers in the hoses 202, 204 into the separate inlets 302, 304 of the dispensing gun assembly 300. In one example, the containers 104, 106 may be backfilled with a pressurized gas, such as nitrogen, as the monomers are dispensed out of the containers 104, 106 and into the dispensing gun assembly 300. Optionally, one or more of the containers 104, 106 may not be backfilled with a pressurized gas and the monomers may be drawn or pumped out of the containers 104, 106 to the gun. The dispensing gun assembly 300 may therefore be a high or elevated pressure gun assembly (where the pressure of the monomers is increased above ambient pressure to deliver the monomers to and/or through the dispensing gun assembly 300) or a low, reduced, or non-elevated pressure gun assembly (where the pressure of the monomers is not increased above ambient pressure). The dispensing gun assembly 300 may include a separate inlet 306 that can be coupled with the same or another source of pressurized gas to help force the flowing foam out of the dispensing gun assembly 300.

In operation, the hoses 202, 204 direct the monomers into the dispensing gun assembly 300 where the monomers mix and form the polymer foam in a state that flows out of an outlet 308 of the dispensing gun assembly 300. The dispensing gun assembly 300 can include a trigger 310 that can be pressed by an operator to begin dispensing of the flowing polymer foam out of the outlet 308. The dispensing gun assembly 300 can include one or more internal valves, solenoids, or the like, that are controlled by a timing unit (that can be included in or separate from the computer controller 110) to provide different ratios of the monomers (to provide different mixtures of the monomers, which will produce foams having different properties) and/or stop flow of the polymer foam out of the dispensing gun assembly 300.

The timing unit can ensure that a desired amount of polymer foam having a desired density is output from the dispensing gun assembly 300. One or more desired characteristics of a foam body to be formed using the system 100 can be input into the timing unit. In one example, an operator can input (e.g., using a keypad, touchscreen, or the like) the density and/or amount (e.g., by volume and/or by weight) of the foam body that is to be created using the system 100. As another example, the molds 112, 114 shown in FIG. 1 may have one or more bar codes or other identifying information printed or adhered to the molds 112, 114. The operator can input this identifying information into the computer controller 110, such as by using a bar code reader, keypad, touchscreen, etc.

The timing unit can store different densities and/or amounts of foam to be dispensed by the dispensing gun assembly 300, along with different dispensing times. For example, different first and second foam bodies may need to be formed in the molds 112, 114. The first and second foam bodies may be desired to have the same densities, but the foam body formed in the mold 112 may be larger than the foam body formed in the mold 114. The timing unit can store the amounts of foam that need to be dispensed from the dispensing gun assembly 300 to create the first and second foam bodies, respectively.

To form the first foam body, the operator can input identifying information of the mold 112 (e.g., by scanning a bar code) into the timing unit and the timing unit can determine how long the dispensing gun assembly 300 should direct the flowing polymer foam out of the outlet 308. For example, the timing unit can access an internal or external computer memory that stores a dispensing time or a shot time. This time is the temporal duration during which the polymer foam needs to flow out of the dispensing gun assembly 300 in order to fill the mold 112 with enough foam to form the first foam body but without dispensing more foam than what is needed (to prevent catastrophic failure of the mold that can occur when too much foam is dispensed).

The operator can then move the dispensing gun assembly 300 to the mold 112 while the dispensing gun assembly 300 remains fluidly coupled to the heated containers 104, 106 by the heated hoses 202, 204. The operator can press the trigger 308 of the dispensing gun assembly 300 to cause the timing unit to display the dispensing time associated with the mold 112 on a display (e.g., on the dispensing gun assembly 300 and/or a nearby display device). This display ensures that the operator is preparing to dispense the correct amount of foam for the mold being filled. The operator can press the trigger 308 a second time to cause the dispensing gun assembly 300 to start mixing the monomers to form a flowing polymer foam and dispensing the polymer foam out of the outlet 308. The timing unit can begin tracking an elapsed amount of time once the operator presses the trigger 310 this second time and the polymer foam begins flowing out of the outlet 308 of the dispensing gun assembly 300. The timing unit can continue to dispense the polymer foam flowing out of the dispensing gun assembly 300 until the elapsed time (that the polymer foam is flowing out of the dispensing gun assembly 300) reaches the stored dispensing time associated with the mold 112.

Once this time is reached, the timing unit can automatically stop the flow of the polymer foam out of the dispensing gun assembly 300. For example, the timing unit can automatically close a valve in the dispensing gun assembly 300 to stop the flow of the polymer foam out of the dispensing gun assembly 300, regardless of whether the operator continues to press the trigger 310. This can allow the system 100 to dispense only the amount of foam that fills the mold 112 without over- or under-filling the mold 112. This can eliminate waste of the materials used to form the polymer foam, prevent failure of the mold 112, avoid creating foam with undesirable properties (e.g., density, weight, size, shape, etc.), avoid creating hazardous conditions for the operator, etc.

Then, to form the second foam body, the operator can input identifying information of the mold 114 into the timing unit and the timing unit can determine the dispensing time associated with the mold 114, similar to as described above in connection with the mold 112. Because the mold 114 may be smaller than the mold 112, the dispensing time associated with the mold 114 may be shorter than the dispensing time associated with the mold 112.

The operator can then move the dispensing gun assembly 300 to the mold 114 while the dispensing gun assembly 300 remains fluidly coupled to the heated containers 104, 106 by the heated hoses 202, 204. The timing unit can begin tracking an elapsed amount of time once the operator presses the trigger 310 of the dispensing gun assembly 300 and the polymer foam begins flowing out of the outlet 308 of the dispensing gun assembly 300. The timing unit can continue to dispense the polymer foam flowing out of the dispensing gun assembly 300 until the elapsed time (that the polymer foam is flowing out of the dispensing gun assembly 300) reaches the stored dispensing time associated with the mold 114. Once this time is reached, the timing unit can automatically stop the flow of the polymer foam out of the dispensing gun assembly 300. This can allow the system 100 to dispense only the amount of foam that fills the mold 114 without over- or under-filling the mold 114. One or more additional molds 112, 114 can be filled in a similar way. Once the filling of molds 112 and/or 114 is complete, a gas (e.g., air) can be directed through the dispensing gun assembly 300 to clean out any remaining foam from inside the dispensing gun assembly 300.

The timing unit optionally can be calibrated to adjust the dispensing time for one or more of the molds 112, 114. For example, due to fluctuations in temperature, fluctuations in pressure, partially clogged hoses 202, 204 or conduits, or the like, the amount of flowing polymer foam that is output by the dispensing gun assembly 300 may under- or over-fill one or more of the molds 112, 114. To prevent or correct for this, an operator can provide input to the timing unit to dispense a defined amount of the flowing polymer foam from the dispensing gun assembly 300. This foam can be weighed (e.g., by dispensing into a bag or other container and then weighing the foam in the bag or container) and compared to a designated weight associated with the defined amount of foam that was to be dispensed. If the difference between the designated weight and the measured weight of the dispensed foam is greater than a designated threshold (e.g., more than 5%, more than 10%, or the like, in different embodiments), then the timing unit can be calibrated.

For example, the difference or percentage difference between the measured weight and the designated weight can be input to the timing unit. The timing unit can then adjust the dispensing time used for one or more of the molds 202, 204 by this difference. For example, if the measured weight was 8% less than the designated weight, then the computer controller 110 can lengthen or extend the designated dispensing time associated with one or more (or all) of the molds 112, 114. This can ensure that the molds 112, 114 are not underfilled. As another example, if the measured weight was 5% more than the designated weight, then the computer controller 110 can shorten or reduce the designated dispensing time associated with one or more (or all) of the molds 112, 114. This can ensure that the molds 112, 114 are not overfilled.

As shown in FIG. 1, the system 100 includes an overhead supporting track 116 that supports the hoses 202, 204 while the operator moves the dispensing gun assembly 300 between the molds 112, 114 being filled. One or more supporting lines or cables 118 can be coupled with the hoses 202, 204 at one end and can be coupled with the track 116 at the other end. The end of the lines or cables 118 that is coupled with the track 116 can move back-and-forth along the length of the track 116. This can reduce the weight of the hoses 202, 204 that are otherwise carried or supported by the operator. Additionally, the track 116 can prevent the hoses 202, 204 from coiling up and/or bending too much, which otherwise could cause breaking of the heating elements extending along the lengths of the hoses 202, 204.

In one embodiment, scales may be placed below one or more of the containers 202, 204 to monitor the weight of the monomers stored in the containers 202, 204. The computer controller 110 can track the weight of one or more of the containers 202, 204 and automatically notify an operator of when one or more of the containers 202, 204 needs to be replaced or refilled.

Figure 4:
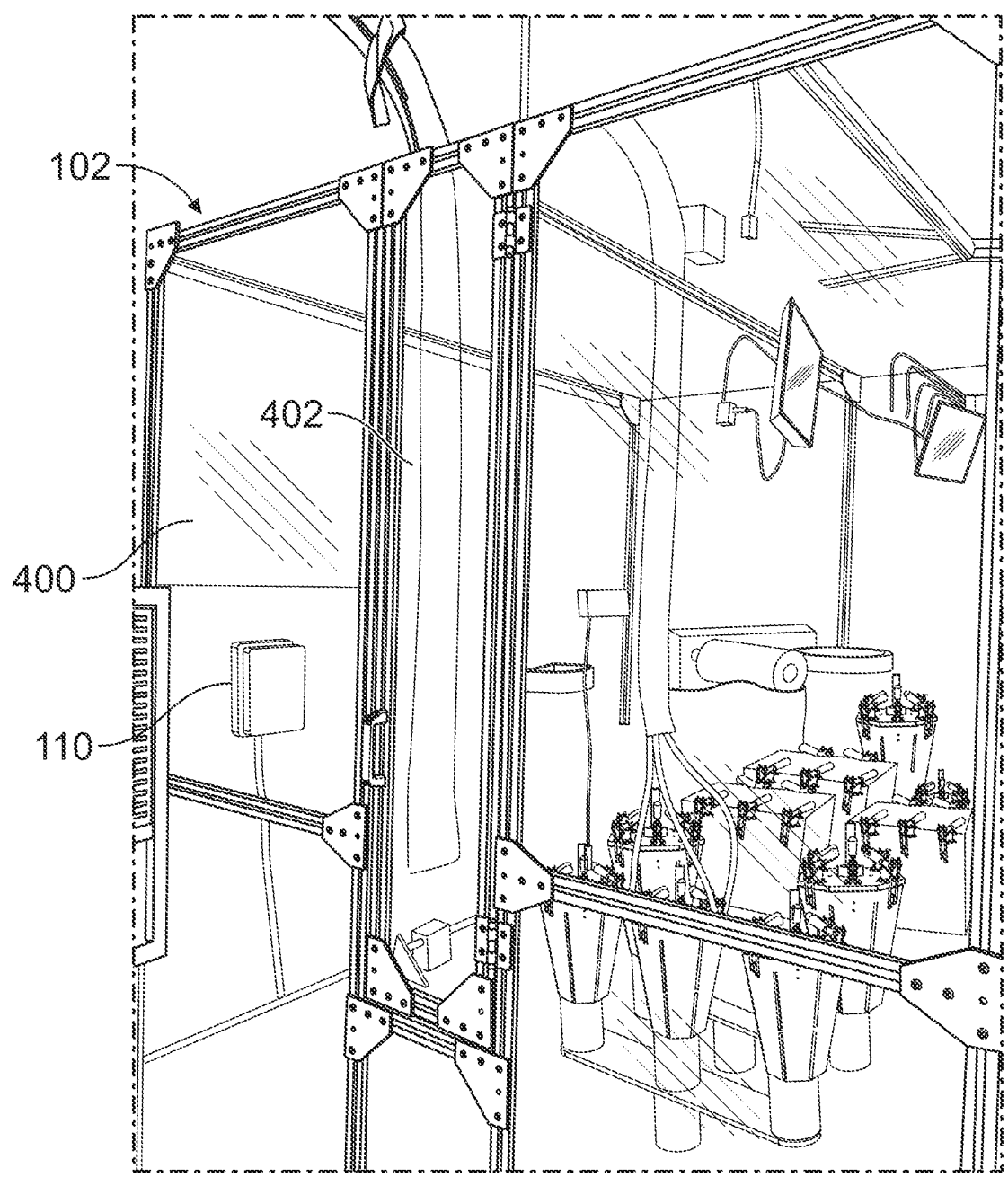
FIG. 4 illustrates a view of a vertical wall of the heat-containment housing shown in FIG. 1.

FIG. 4 illustrates a view of a vertical wall 400 of the heat-containment housing 102 shown in FIG. 1. The vertical wall 400 can be the wall that faces the molds 112, 114 shown in FIG. 1. As shown, the vertical wall 400 includes a small access door 402 through which the dispensing gun assembly 300 and the hoses 202, 204 may move out of or into the heat-containment housing 102. For example, prior to and after dispensing foam to fill the molds 112, 114, the dispensing gun assembly 300 and the hoses 202, 204 may be disposed inside the housing 102. The access door 402 can be opened to allow the dispensing gun assembly 300 and parts of the hosts 202, 204 to be pulled out of the housing 102. The dispensing gun assembly 300 can be moved to the molds 112, 114 for filling, as described above. The dispensing gun assembly 300 and the hoses 202, 204 can then be placed back into the housing 102 via the access door 402 and the access door 402 closed. Using the smaller access door 402 can help retain heat within the housing 102 and reduce the temperature drop in the housing 102 when the dispensing gun assembly 300 is removed from the housing 102 relative to a larger door being opened. The dispensing gun assembly 300 can be formed of a thermally conductive material that transfers heat very quickly (e.g., aluminum). The access door 402 can allow for the storage of the dispensing gun assembly 300 inside the heated housing 102 to keep the dispensing gun assembly 300 at the desired temperature for as long as possible before dispensing commences and can prevent the foam from being cooled as the foam flows through the dispensing gun assembly 300. Cooling of the dispensing gun assembly 300 (e.g., to room temperature or 20 degrees Celsius) can change properties of the foam by as much as 7%, increase the costs associated with the foam, and reduce the quality of the foam.

Figure 5:
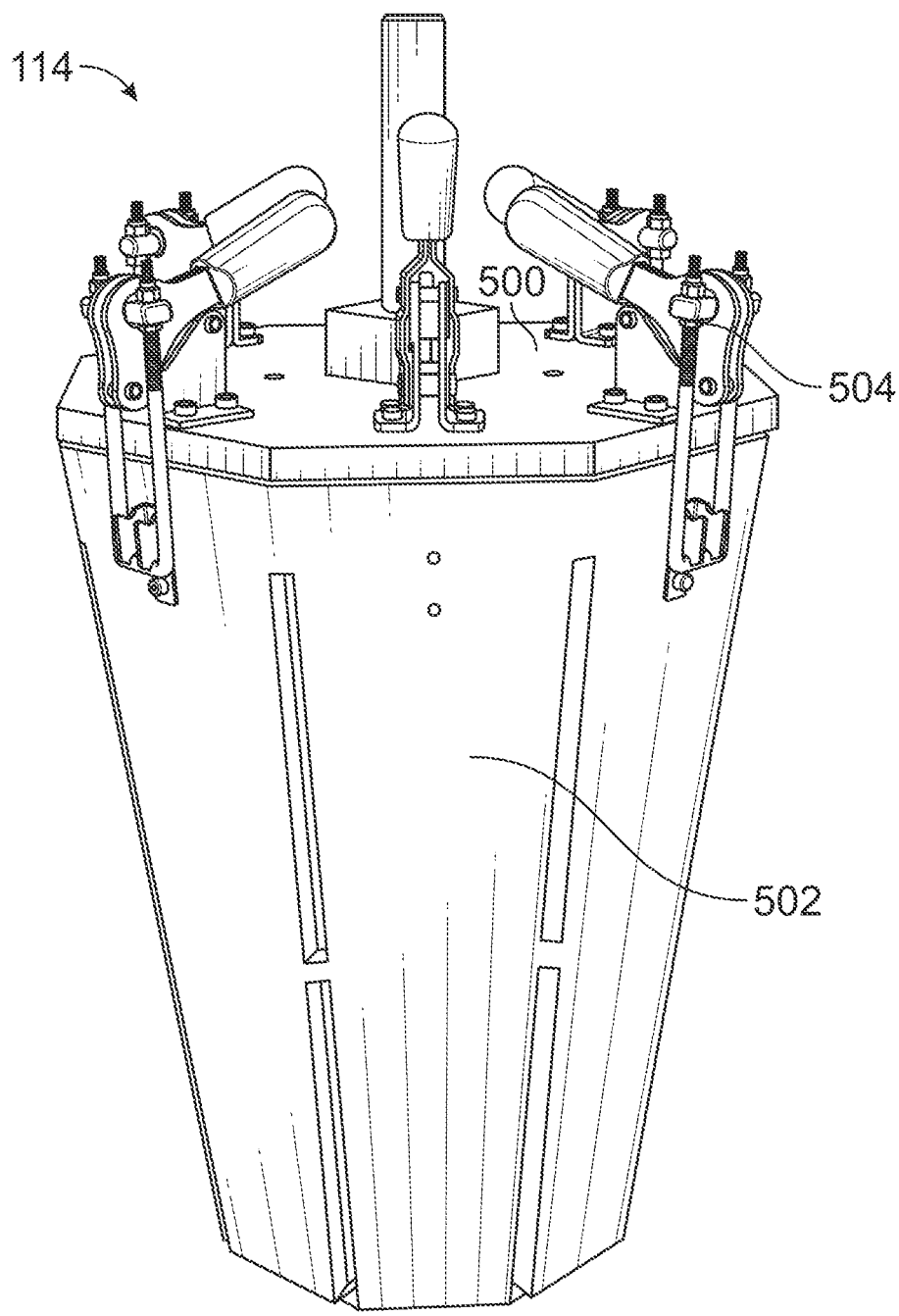
FIG. 5 illustrates one example of a mold shown in FIG. 1.
Figure 6:
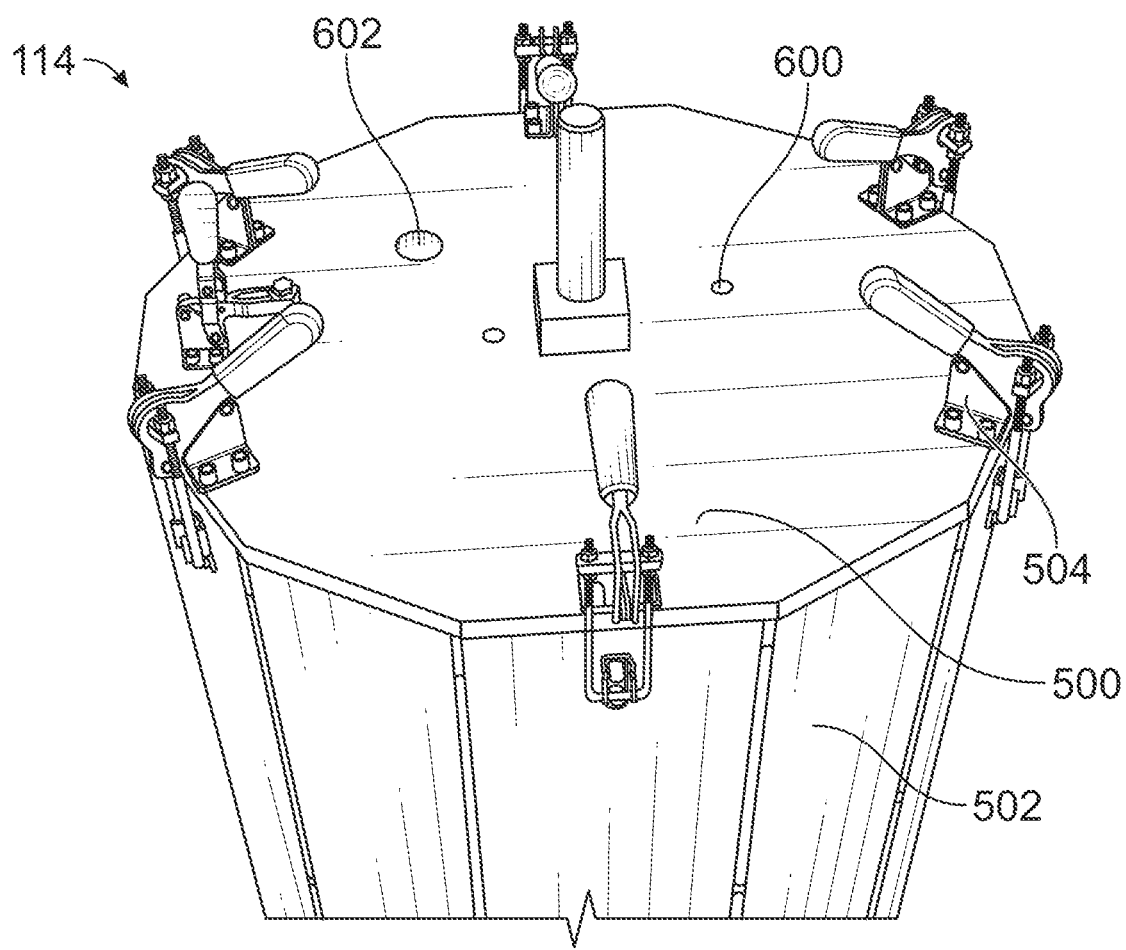
FIG. 6 also illustrates the mold shown in FIG. 5.

FIGS. 5 and 6 illustrate one example of the mold 114 shown in FIG. 1. The mold 114 includes a lid 500 held to a main body 502 of the mold 114. The main body 502 of the mold 114 defines the shape of the solid foam body to be formed using the polymer foam in the mold 114. As shown in FIG. 1, the main body 502 of the mold 114 can be secured to the floor or another surface by coupling the main body 502 to attachment blocks 120. These blocks 120 can secure the molds 112, 114 to the floor and prevent the molds 112, 114 from tipping over.

The lid 500 includes several clamps 504 that latch onto and secure the lid 500 to the main body 502. The lid 500 also includes one or more vent holes 600 (shown in FIG. 6) and at least one filling hole 602 (shown in FIG. 6). The lid 500 can be placed onto the main body 502 and the clamps 504 secured to the main body 502 prior to filling the main body 502 with the polymer foam. The outlet 308 of the dispensing gun assembly 300 can be inserted into the filling hole 602 and the foam dispensed from the dispensing gun assembly 300 into the main body 502 via the filling hole 602. A plug may be inserted into the filling hole 602 after filling the mold 114. The vent holes 600 can allow backpressure within the mold 114 to vent out of the mold 114. The polymer foam is then allowed to continue reacting, curing, or otherwise solidifying within the mold 114. The lid 500 can then be removed and a semi-rigid or rigid polymer foam body in the mold 114 can be removed. The sizes (e.g., diameters) and locations of the vent holes 600 can be critical to performance of the foam as air trapped in the mold 114 and/or a lack of backpressure (e.g., from the atmosphere entering into the mold 114 via the vent holes 600) can decrease the quality of the foam.

Optionally, one or more heating elements may be disposed below, around, and/or above the molds 112, 114 to heat the molds 112, 114 while the polymer foam reacts, cures, or solidifies within the molds 112, 114. The reaction between the monomers in the dispensed foam (to foam more rigid foam) can rely on heat from the heating elements as a catalyst to the reaction. Controlling the temperature of the molds 112, 114 can help to control the quality and/or properties of the foam.

Figure 7:
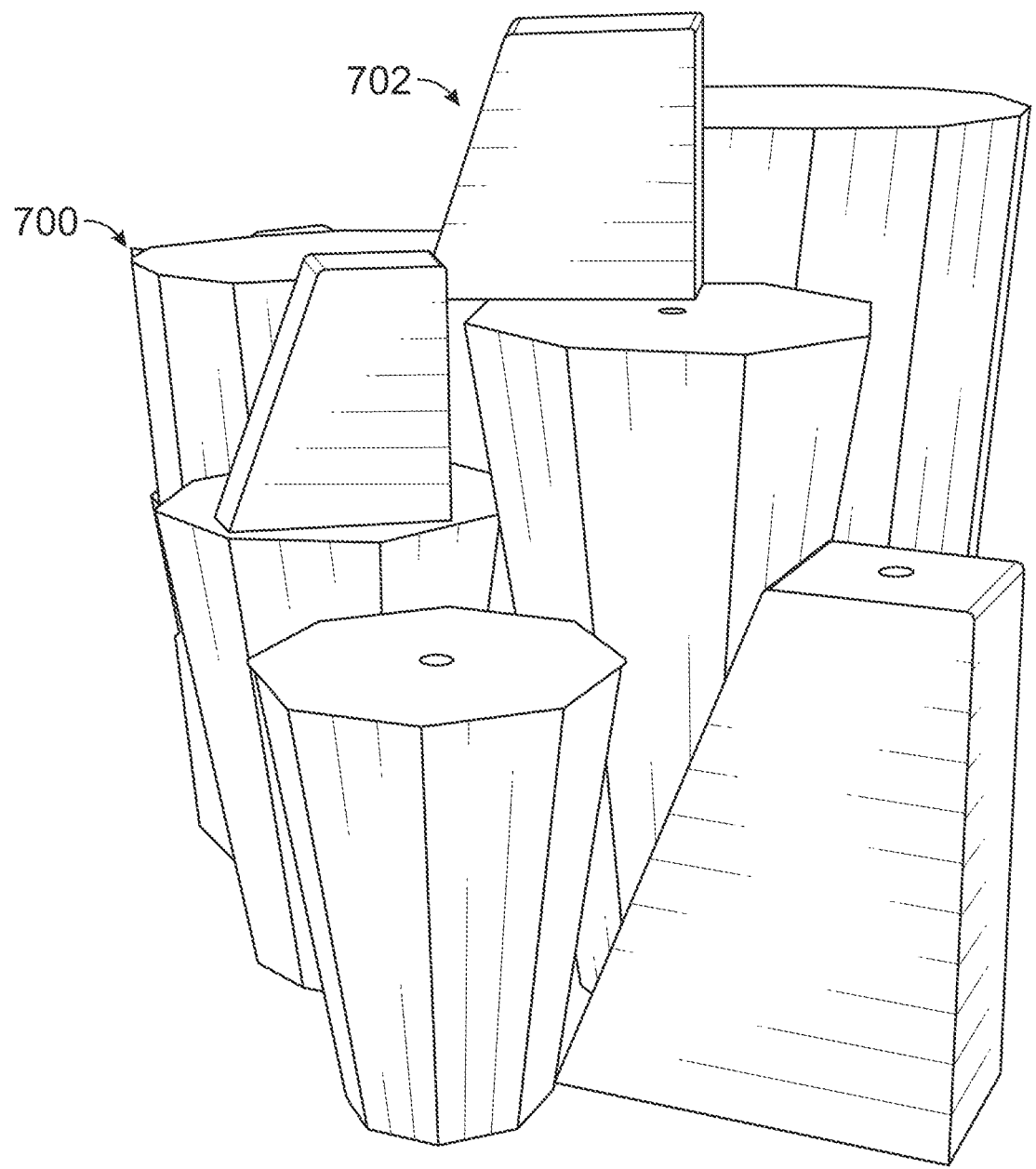
FIG. 7 illustrates examples of polymer foam bodies that can be created using the polymer foam system.

FIG. 7 illustrates examples of polymer foam bodies 700, 702 that can be created using the system 100. The polymer foam bodies 700, 702 can have a variety of shapes and/or sizes depending on the size and/or shape of the molds 112, 114. The polymer foam bodies 700, 702 can be cut, shaved, or otherwise shaped into one or more finished shapes, such as for use in the production process of a prosthetic and/or orthotic.

Figure 8:
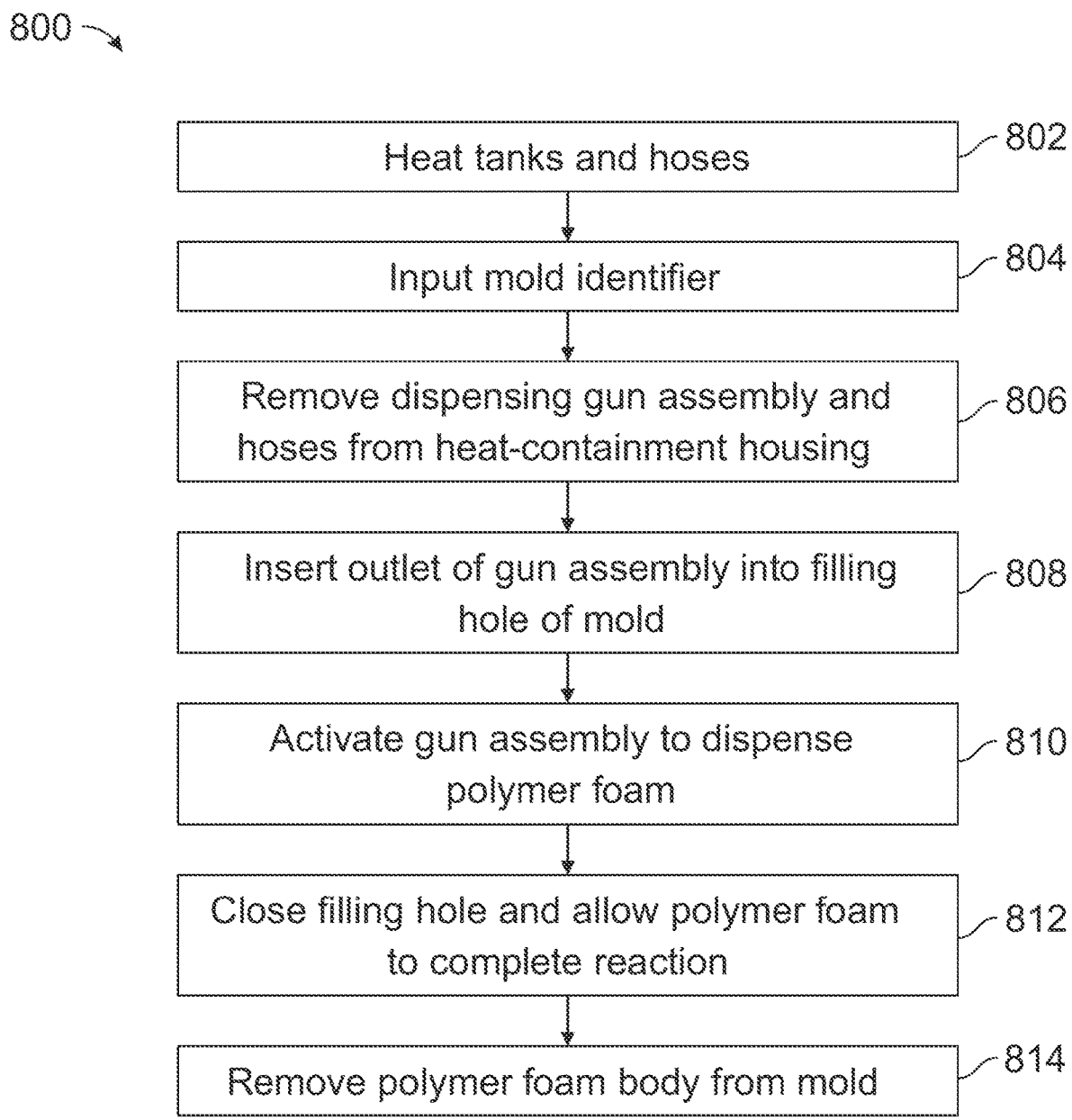
FIG. 8 illustrates a flowchart of one embodiment of a method for forming polymer foam bodies.

FIG. 8 illustrates a flowchart of one embodiment of a method 800 for forming polymer foam bodies. The method 800 can represent operations performed by the system 100 to create polymer foam bodies, such as polyurethane foam bodies. At 802, containers holding monomers used to form the polymer foam and hoses that carry the monomers to a dispensing gun assembly are heated. For example, the temperature of the containers and hoses may be elevated using heating elements. At 804, a mold in which the polymer foam body will be formed is identified. For example, a bar code reader may be used to scan a bar code printed on the mold, an operator may input information identifying the mold, or the like, so that the computer controller can determine how long to dispense polymer foam to fill the mold. At 806, the dispensing gun assembly and at least part of the hoses are removed from the heat-containment housing and moved to the location of the mold(s). At 808, an outlet of the dispensing gun assembly is inserted into a filling hole of a mold. At 810, the dispensing gun assembly is activated to dispense the polymer foam. As described above, an operator may depress a trigger of the dispensing gun assembly twice to begin dispensing the polymer foam into the mold. The computer controller can allow the polymer foam to be dispensed until a timer expires. The length of this timer can be based on the amount of foam to be dispensed into the mold, the rate at which the foam is dispensed out of the dispensing gun assembly, and the amount of foam needed to fill the mold. Once the timer expires, the computer controller can automatically stop the flow of the polymer foam out of the dispensing gun assembly.

At 812, the outlet of the dispensing gun assembly is removed from the filling hole of the mold, and the filling hole can be plugged or otherwise closed. At 814, the materials dispensed into the mold to form the foam continue to react and solidify the polymer foam. At 814, once the polymer foam is solidified, the mold can be opened, and the polymer foam body is removed.

In one embodiment, a system includes a heat-containment housing configured to store monomer containers, temperature-controlled hoses separately coupled with the containers and configured to receive monomers from the containers, a dispensing gun assembly fluidly coupled with the containers by the hoses, and a computer controller configured to control a dispensing time period during which the monomers are dispensed from the containers and through the hoses to the dispensing gun assembly and dispensed out of the dispensing gun assembly as a polymer foam. The controller is configured to stop dispensing of the polymer foam out of the dispensing gun assembly upon expiration of the dispensing time period.

Optionally, a timing unit is configured to determine the dispensing time period based on an identification of a mold into which the polymer foam is dispensed from the dispensing gun assembly.

Optionally, the timing unit is configured to receive the identification of the mold from an operator.

Optionally, the timing unit is configured to receive the identification of the mold from a bar code reader.

Optionally, the system also includes one or more heating elements coupled with one or more of the containers or the hoses. The one or more heating elements can be configured to elevate temperatures of the monomers.

Optionally, the one or more heating elements include at least one heating element for each of the hoses, and the controller can be configured to individually heat each of the hoses using the heating elements.

Optionally, the heat-containment housing is configured to maintain an elevated temperature of the containers within the heat-containment housing.

Optionally, the heat-containment housing includes an access door through which the dispensing gun assembly and the hoses exit the heat-containment housing to fill the mold with the polymer foam.

Optionally, the system also includes an overhead supporting track that is coupled with the hoses to support weight of the hoses.

Optionally, the dispensing gun assembly is configured to dispense the polymer foam into a mold that is coupled with a block that secures the mold to a floor surface.

In one embodiment, a method includes heating monomer containers and hoses coupled with the containers and determining a dispensing time period during which monomers are dispensed from the containers and through the hoses to a dispensing gun assembly into a mold as a polymer foam. A temperature to which the monomers is heated, and the dispensing time period are based on each other. The method also can include determining when initiation of dispensing of the polymer foam begins, determining when expiration of the dispensing time period has expired, and stopping the dispensing of the polymer foam from the dispensing gun assembly responsive to expiration of the dispensing time period.

Optionally, the dispensing time period is determined based on an identification of a mold into which the polymer foam is dispensed from the dispensing gun assembly.

Optionally, the identification of the mold is received from an operator.

Optionally, the identification of the mold is received from a bar code reader.

Optionally, heating the hoses includes individually controlling a temperature of each of the hoses.

In one embodiment, a system includes hoses separately coupled with monomer containers and configured to receive monomers from the containers, a dispensing gun assembly fluidly coupled with the containers by the hoses, and a controller configured to control a dispensing time period during which the monomers are dispensed from the containers and through the hoses to the dispensing gun assembly and dispensed out of the dispensing gun assembly into a mold as a polymer foam. The dispensing time period is based on an identification of the mold. The controller is configured to stop dispensing of the polymer foam out of the dispensing gun assembly upon expiration of the dispensing time period.

Optionally, the controller is configured to receive the identification of the mold from a bar code reader.

Optionally, the system also includes one or more heating elements coupled with one or more of the containers or the hoses, the one or more heating elements configured to elevate temperatures of the monomers.

Optionally, the one or more heating elements include at least one heating element for each of the hoses, and the controller is configured to individually heat each of the hoses using the heating elements.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a heat-containment housing configured to store monomer containers;
temperature-controlled hoses separately coupled with the containers and configured to receive monomers from the containers;
heating elements coupled with the hoses and configured to heat the monomers in the hoses;
a dispensing gun assembly fluidly coupled with the containers by the hoses; and
a computer controller configured to control a temperature to which the heating elements heat the monomers in the hoses such that the monomers in different ones of the hoses are heated to different temperatures, the computer controller also configured to control a dispensing time period during which the monomers are dispensed from the containers and through the hoses to the dispensing gun assembly and dispensed out of the dispensing gun assembly as a polymer foam, the controller configured to stop dispensing of the polymer foam out of the dispensing gun assembly upon expiration of the dispensing time period, the controller further configured to adjust the dispensing time period based on a temperature fluctuation, a pressure fluctuation, and a difference between a designated polymer foam weight and a measured polymer foam weight, the computer controller is configured to store associations between different designated polymer foam densities and different values of the dispensing time period, the computer controller also configured to change the dispensing time period based on a selection of at least one of the different designated polymer foam densities.

2. The system of claim 1, wherein the controller is configured to determine the dispensing time period based on an identification of a mold into which the polymer foam is dispensed from the dispensing gun assembly.

3. The system of claim 2, wherein the controller is configured to receive the identification of the mold from an operator.

4. The system of claim 2, wherein the controller is configured to receive the identification of the mold from a bar code reader.

5. The system of claim 1, wherein the heat-containment housing is configured to maintain an elevated temperature of the containers within the heat-containment housing.

6. The system of claim 1, wherein the heat-containment housing includes an access door through which the dispensing gun assembly and the hoses exit the heat-containment housing to fill a mold with the polymer foam.

7. The system of claim 1, further comprising an overhead supporting track that is coupled with the hoses to support weight of the hoses.

8. The system of claim 1, wherein the dispensing gun assembly is configured to dispense the polymer foam into a mold that is coupled with a block that secures the mold to a floor surface.

9. The system of claim 1, wherein the computer controller is configured to adjust the dispensing time by dispensing a defined amount of the polymer foam from the dispensing gun assembly, comparing the measured polymer foam weight of the defined amount of the polymer foam that was dispensed by the dispensing gun assembly with the designated polymer foam weight to determine the difference between the designated polymer foam weight and the measured polymer foam weight, and either lengthening the dispensing time responsive to the measured polymer foam weight being lighter than the designated weight or shortening the dispensing time responsive to the measured polymer foam weight being heavier than the designated polymer foam weight.

10. The system of claim 1, wherein the heating elements include first heating elements coupled with the hoses and second heating elements disposed beneath the containers, the computer controller configured to control the second heating elements to heat an interior of the heat-containment housing to a designated temperature.

11. The system of claim 10, wherein the computer controller is configured to change one or more of a density, a weight, or a resilience of the polymer foam that is dispensed from the dispensing gun assembly by changing one or more of the temperatures to which one or more of the containers is heated by the second heating elements.

12. The system of claim 1, wherein the computer controller is configured to change one or more of a density, a weight, or a resilience of the polymer foam that is dispensed from the dispensing gun assembly by changing one or more of the temperatures to which one or more of the hoses is heated by the heating elements.

13. The system of claim 1, wherein the computer controller is configured to adjust the dispensing time by dispensing a defined amount of the polymer foam from the dispensing gun assembly, comparing the measured polymer foam weight of the defined amount of the polymer foam that was dispensed by the dispensing gun assembly with the designated polymer foam weight to determine the difference between the designated polymer foam weight and the measured polymer foam weight, and either lengthening the dispensing time responsive to the measured polymer foam weight being lighter than the designated weight or shortening the dispensing time responsive to the measured polymer foam weight being heavier than the designated polymer foam weight,
- the heating elements including first heating elements coupled with the hoses and second heating elements disposed beneath the containers, the computer controller configured to control the second heating elements to heat an interior of the heat-containment housing to a designated temperature, the computer controller configured to change one or more of a density, a weight, or a resilience of the polymer foam that is dispensed from the dispensing gun assembly by changing one or more of the temperatures to which one or more of the containers is heated by the second heating elements or by changing one or more of the temperatures to which one or more of the hoses is heated by the heating elements,
- the computer controller configured to store associations between different designated polymer foam densities and different values of the dispensing time period, the computer controller also configured to change the dispensing time period based on a selection of at least one of the different designated polymer foam densities.

14. A system comprising:
hoses separately coupled with monomer containers and configured to receive monomers from the containers;
heating elements coupled with the hoses and configured to heat the monomers in the hoses;
a dispensing gun assembly fluidly coupled with the containers by the hoses; and
a controller configured to control a temperature to which the heating elements heat the monomers in the hoses such that the monomers in different ones of the hoses are heated to different temperatures, the controller also configured to control a dispensing time period during which the monomers are dispensed from the containers and through the hoses to the dispensing gun assembly and dispensed out of the dispensing gun assembly into a mold as a polymer foam, the dispensing time period based on an identification of the mold, the controller configured to stop dispensing of the polymer foam out of the dispensing gun assembly upon expiration of the dispensing time period, the controller further configured to adjust the dispensing time period based on a temperature fluctuation, a pressure fluctuation, and a difference between a designated polymer foam weight and a measured polymer foam weight, the controller configured to store associations between different designated polymer foam densities and different values of the dispensing time period, the controller also configured to change the dispensing time period based on a selection of at least one of the different designated polymer foam densities.

15. The system of claim 14, wherein the controller is configured to receive the identification of the mold from a bar code reader.

16. The system of claim 14, wherein the controller is configured to adjust the dispensing time by dispensing a defined amount of the polymer foam from the dispensing gun assembly, comparing the measured polymer foam weight of the defined amount of the polymer foam that was dispensed by the dispensing gun assembly with the designated polymer foam weight to determine the difference between the designated polymer foam weight and the measured polymer foam weight, and either lengthening the dispensing time responsive to the measured polymer foam weight being lighter than the designated weight or shortening the dispensing time responsive to the measured polymer foam weight being heavier than the designated polymer foam weight.

17. The system of claim 14, wherein the hoses, the heating elements, and the containers are disposed within a heat-containment housing, the heating elements including first heating elements coupled with the hoses and second heating elements disposed beneath the containers, the controller configured to control the second heating elements to heat an interior of the heat-containment housing to a designated temperature, the controller configured to change one or more of a density, a weight, or a resilience of the polymer foam that is dispensed from the dispensing gun assembly by changing one or more of the temperatures to which one or more of the containers is heated by the second heating elements.

18. The system of claim 14, wherein the controller is configured to change one or more of a density, a weight, or a resilience of the polymer foam that is dispensed from the dispensing gun assembly by changing one or more of the temperatures to which one or more of the hoses is heated by the heating elements.

19. The system of claim 14, wherein the controller is configured to adjust the dispensing time by dispensing a defined amount of the polymer foam from the dispensing gun assembly, comparing the measured polymer foam weight of the defined amount of the polymer foam that was dispensed by the dispensing gun assembly with the designated polymer foam weight to determine the difference between the designated polymer foam weight and the measured polymer foam weight, and either lengthening the dispensing time responsive to the measured polymer foam weight being lighter than the designated weight or shortening the dispensing time responsive to the measured polymer foam weight being heavier than the designated polymer foam weight,
- the heating elements including first heating elements coupled with the hoses and second heating elements disposed beneath the containers within a heat-containment housing, the controller configured to control the second heating elements to heat an interior of the heat-containment housing to a designated temperature, the controller configured to change one or more of a density, a weight, or a resilience of the polymer foam that is dispensed from the dispensing gun assembly by changing one or more of the temperatures to which one or more of the containers is heated by the second heating elements or by changing one or more of the temperatures to which one or more of the hoses is heated by the heating elements,
- the controller configured to store associations between different designated polymer foam densities and different values of the dispensing time period, the controller also configured to change the dispensing time period based on a selection of at least one of the different designated polymer foam densities.

* * * * *